(12) United States Patent
Gale et al.

(10) Patent No.: US 10,325,489 B2
(45) Date of Patent: Jun. 18, 2019

(54) DYNAMIC NATURAL GUIDANCE

(75) Inventors: William Gale, Oak Park, IL (US); Joseph Mays, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 1233 days.

(21) Appl. No.: 13/538,227

(22) Filed: Jun. 29, 2012

(65) Prior Publication Data
US 2014/0005929 A1 Jan. 2, 2014

(51) Int. Cl.
*G08G 1/0967* (2006.01)

(52) U.S. Cl.
CPC . *G08G 1/096716* (2013.01); *G08G 1/096741* (2013.01); *G08G 1/096775* (2013.01); *B60W 2550/20* (2013.01)

(58) Field of Classification Search
CPC .... G01C 21/20; G01C 21/36; G01C 21/3626; G01C 21/3667; A61H 2201/1604; A61H 3/061; G06K 9/00778; G06T 7/20; G01S 19/14; G08G 1/096716; G08G 1/096775; G08G 1/205; G08G 1/096741; G08G 1/096872; G08G 1/0968; G08G 1/096877; B60W 2550/20; B60R 2300/8086; G05D 1/0044
See application file for complete search history.

(56) References Cited

U.S. PATENT DOCUMENTS

| | | | |
|---|---|---|---|
| 6,529,831 B1 | 3/2003 | Smith et al. | |
| 6,633,232 B2 * | 10/2003 | Trajkovic | G06Q 30/06 340/573.1 |
| 7,650,217 B2 | 1/2010 | Ueyama | |
| 7,912,637 B2 | 3/2011 | Horvitz et al. | |
| 2007/0276596 A1 | 11/2007 | Solomon et al. | |
| 2011/0054772 A1* | 3/2011 | Rossio | G01C 21/3644 701/532 |
| 2011/0092249 A1* | 4/2011 | Evanitsky | 455/556.1 |
| 2011/0112759 A1 | 5/2011 | Bast et al. | |
| 2012/0062357 A1* | 3/2012 | Slamka | 340/4.11 |
| 2012/0106801 A1* | 5/2012 | Jackson | G08G 1/205 382/105 |
| 2012/0194551 A1* | 8/2012 | Osterhout et al. | 345/633 |
| 2013/0231857 A1* | 9/2013 | Beaurepaire | G01C 21/20 701/428 |

OTHER PUBLICATIONS

U.S. Appl. No. 13/537,884, filed Jun. 29, 2012, Slusar et al.
TYZX Systems that See, "Selecting a Person-Tracking Solution for Security, Retail, or Interactive Entertainment", accessed May 31, 2012.

* cited by examiner

*Primary Examiner* — Adam D Tissot
*Assistant Examiner* — Aaron C Smith
(74) *Attorney, Agent, or Firm* — Lempia Summerfield Katz LLC

(57) ABSTRACT

In one embodiment, dynamic natural guidance is generated for a route between an origin and a destination. A controller receives data indicative of a location of the mobile device and data indicative of at least one movable object detected in a vicinity of the mobile device. The data indicative of at least one movable object may be collected by a camera and analyzed. The analysis may include one or more of image processing techniques, temporal measurement, and tracking of movable objects. The controller generates a guidance command based on the location of the mobile device. The guidance command references the at least one movable object detected in the vicinity of the mobile device.

20 Claims, 9 Drawing Sheets

DYNAMIC NATURAL GUIDANCE

FIELD

The following disclosure relates to operating a navigation system, and more particularly to providing route information using dynamic natural guidance along a route.

BACKGROUND

Navigation systems provide end users with various navigation-related functions and features. For example, some navigation systems are able to determine an optimum route to travel along a road network from an origin location to a destination location in a geographic region. Using input from the end user, the navigation system examines potential routes between the origin location and the destination location to determine the optimum route. The navigation system may then provide the end user with information about the optimum route in the form of guidance that identifies the maneuvers required to be taken by the end user to travel from the origin to the destination location. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The represented geographic features may include one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. One area in which there is room for improvement relates to providing guidance to follow a route. The geographic data used in conventional navigation systems is static. The geographic data is stored ahead of time in the database representing physical features that do not generally change over time. The optimal landmarks or features in the geographic region to provide the navigation-related functions and features may not be included in the conventional geographic database.

SUMMARY

In one embodiment, dynamic natural guidance is generated for a route between an origin and a destination. A controller receives data indicative of a location of the mobile device and data indicative of at least one movable object detected in a vicinity of the mobile device. The data indicative of at least one movable object may be collected by a camera and analyzed. The analysis may include one or more of image processing techniques, temporal measurement, and tracking of movable objects. The controller generates a guidance command based on the location of the mobile device. The guidance command references the at least one movable object detected in the vicinity of the mobile device.

BRIEF DESCRIPTION OF THE DRAWINGS

Exemplary embodiments of the present invention are described herein with reference to the following drawings.

DETAILED DESCRIPTION

The disclosed embodiments relate to presenting dynamic natural guidance. The term guidance refers to a set of navigation instructions that reference map elements such as roads and distances (e.g., "turn right on Elm Street in 500 feet"). Natural guidance allows navigation systems to expand into unconventional areas, such as malls and office buildings. Natural guidance refers to other elements outside of the map elements but in the vicinity of the user (e.g., "turn right at the fountain" and "turn left past the coffee shop"). Natural guidance may be defined as a turn-by-turn experience encompassing multiple attributes and relations which details the user's environment and context, e.g. landmarks, to more natural, environmental and intuitive triggers. Guidance messages formed using natural guidance may provide details of contextual elements, such as landmarks, surrounding decision points such as points of interest, cartographic features and traffic signals and/or stop signs.

The term dynamic natural guidance refers to a set of navigation instructions that reference elements in the vicinity of the user that are movable. An element that is movable is any object whose geographic position may change. Movable objects include but are not limited to people, vehicles, animals, mobile homes, temporary or semi-permanent structures, temporary road signs, and other objects. In addition, movable objects may be defined to include objects whose appearance change such as a rotating or otherwise changing billboard or sign. A natural guidance system identifies the optimal landmarks or features in the geographic region, which may be movable objects or static objects, to provide navigation-related functions and features to the user.

Figure 1:
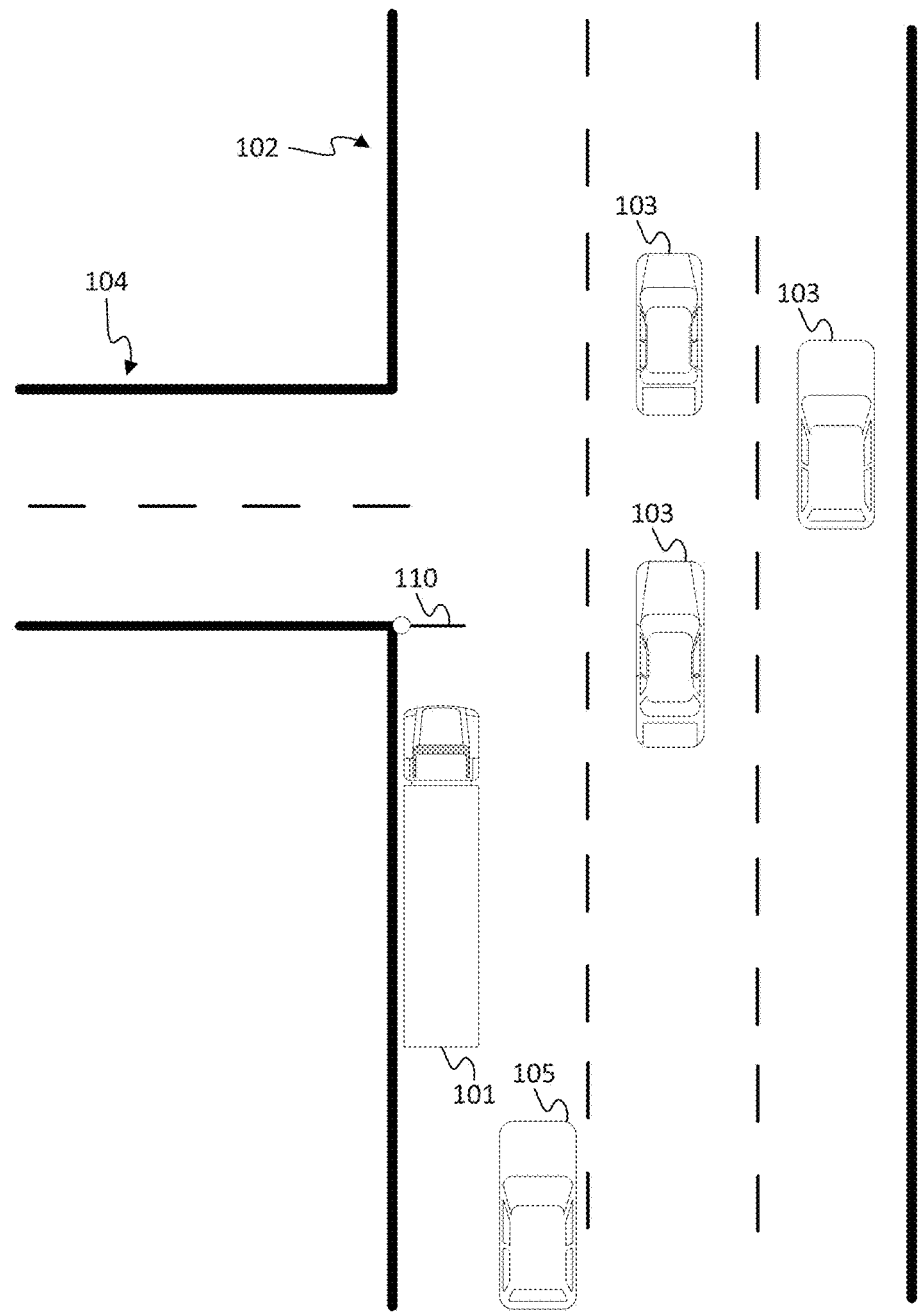
FIG. 1 illustrates an exemplary geographic region.

FIG. 1 illustrates an exemplary geographic region including two roads. Road 102 is the current path in the route and road 104 is designated as the next path in the route. Traveling along road 102 are various vehicles 103 and an object vehicle 105. As an example, road 102 may be referred to as Main Street and road 104 may be referred to as Elm Street. A navigation system in vehicle 105 conveys to a user that the next turn in the route is onto Elm Street. However, the street sign 110 for Elm Street is not visible to the occupants of vehicle 105 because a parked truck 101 is obstructing the view of street sign 110. Accordingly, rather than referring to Elm Street, the navigation system conveys to the user to make the first left turn past the parked truck.

The location of the parked truck 110 is determined from collected data. The collected data may be obtained by a camera. The camera may be a security camera from a nearby building, a traffic camera, a satellite camera, an aerial camera, a camera coupled to the navigation system and/or the vehicle 105, or another type of camera. The phrase "coupled with" is defined to mean directly connected to or indirectly connected through one or more intermediate components. Such intermediate components may include both hardware and software based components.

Data from several types of cameras may be combined into a continuous or semi-continuous database. The cameras may also include indoor cameras that capture data relating to indoor environments. For example, retail cameras track individual shoppers in a store to analyze dwell time or detect shoplifting, amusement park cameras track people to manipulate crowd flow, and airport cameras track travelers to identify suspicious activity. Any of these examples also include data related to movable objects with the potential to provide reference points for guidance maneuvers.

Figure 2:
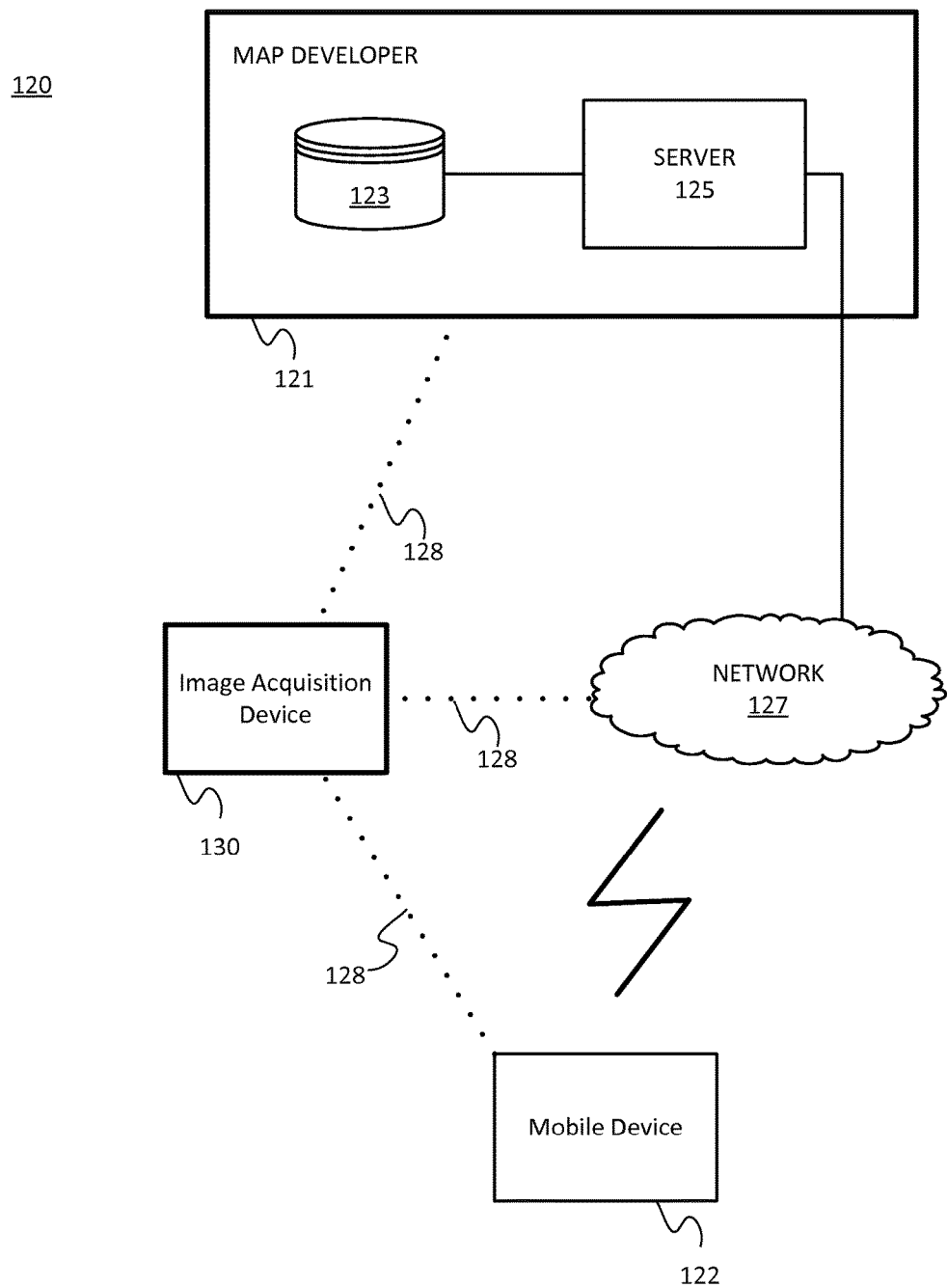
FIG. 2 illustrates an exemplary navigation system.

FIG. 2 illustrates an exemplary navigation system 120. The navigation system 120 includes a map developer system 121, a mobile device 122, an image acquisition device 130 and a network 127. The developer system 121 includes a server 125 and a database 123. The developer system 121 may computer systems and networks of a system operator (e.g., NAVTEQ or Nokia Corp.). The mobile device 122 is a navigation apparatus configured to present dynamic natural guidance to the user. The mobile device 122 is a smart phone, a mobile phone, a personal digital assistant ("PDA"), a tablet computer, a notebook computer, a personal navigation device ("PND"), a portable navigation device, and/or any other known or later developed portable or mobile device. The mobile device 122 includes one or more detectors or sensors as a positioning system built or embedded into or within the interior of the mobile device 122. Alternatively, the operation of the mobile device 122 without a purpose-based position sensor is used by the positioning system (e.g., cellular triangulation). The mobile device 122 receives location data from the positioning system. The mobile device may be referred to as a probe.

The image acquisition device 130 may include a video camera, a still camera, a thermographic camera, an infrared camera, a light detection and ranging (LIDAR) device, electric field sensor, ultrasound sensor, or another type of imaging device. The image acquisition device 130 generates camera data that represents the objects in a scene. The image acquisition device 130 may be coupled to any one of the map developer 121 or the mobile device 122 directly by way of a wired or wireless connection 128 or through the network 127. The mobile device 122 receives data indicative of at least one movable object in a vicinity of the mobile device 122 from the image acquisition device 130, which may or may not be processed by the server 125. The movable object may be any identifiable object that can be referenced in a guidance command and identified by the user. Example movable objects include parked cars, pedestrians, or billboards.

In one embodiment, the server 125 analyzes the data from the image acquisition device 130. The server 125 identifies movable objects in the data. For example, the server 125 may be configured to perform an image processing algorithm on the data collected by the image acquisition device 130. The image processing algorithm may incorporate one or more of edge detection, object recognition, facial recognition, optical character recognition, or feature extraction. Edge detection identifies changes in brightness, which corresponds to discontinuities in depth, materials, or surfaces in the image. Object recognition identifies an object in an image using a set of templates for possible objects. The template accounts for variations in the same object based on lighting, viewing direction, and/or size. Facial recognition extracts features of a face of a person in an image in order to identify particular attributes of the person. The attributes may include gender, age, race, or a particular identity of the person. Optical character recognition may identify one or more alphanumeric characters on the movable object. Feature extraction reduces an image into a set of feature vectors in order to identify an object in the image.

The server 125 may utilize computer vision techniques. The computer vision techniques may include image acquisition, motion analysis, feature extraction, and detection. Computer vision approximates the abilities of human vision. Computer vision techniques may involve the analysis of a three dimensional space from a set of two dimensional images. Alternatively, two-dimensional image processing is used.

From one or more of the analysis techniques above, the server 125 identifies one or more objects from the data collected by the image acquisition device 130. The analyzed collected and/or camera data that identifies movable objects may be referred to as movable object data. The identification of an object may involve a suitability characteristic that determines whether the object is suitable to be used as a landmark to be referenced in a guidance command. In one example, objects suitable to be referenced for guidance may include people and vehicles. In another example, objects suitable to be referenced for guidance may include people standing in line, uniformed people (e.g., police officer, security guard, traffic controller, or traffic guard), secured bicycles, or parked vehicles. Color, text, type, or other identifiable differences of one object to other local objects may indicate that the object is suitable.

In one embodiment, the suitability of the movable object is determined by the server 125 based on the identity of the object. In another embodiment, suitable objects are further analyzed over time. For example, after the movable objects have been identified, the server 125 tracks the position of the movable objects. The server 125 may record the location of the movable objects in order to determine how long the movable objects have been stationary. The server 125 may deem a movable object that has been recently stationary for more than a predetermined time period to be suitable to be referenced for guidance. Example predetermined time periods include but are not limited to 10 seconds, 1 minute, 10 minutes, or 1 hour. In another embodiment, the server 125 may omit the identification of the movable objects and rely on the tracking of the movable objects.

In one embodiment, the suitability of the movable object is determined by server 125 based on the location of the movable object. For example, movable objects near the destination location of the route may be used to reference the final maneuver of a route. The server 125 may be configured to calculate a distance between the movable object and a location along the route and compare the distance to a threshold distance. Example threshold distances include 10 feet, 10 meters, and 100 meters. In one embodiment, movable objects within the threshold distance may be selected to be referenced in a guidance command.

The mobile device 122 displays a guidance command based on the location of the mobile device 122. The guidance command references the at least one movable object in the vicinity of the mobile device 122. The guidance command may include voice or text that states "turn left past the parked truck ahead," "in the next intersection with traffic guards, turn right," or "your destination is a few meters ahead next to the rack of secured bicycles."

The database 123 of the navigation system 120 may be a geographic database. The locations of the movable objects may be incorporated into the geographic database 123. In addition, the geographic database 123 includes information about one or more geographic regions. Located in the geographic region are physical geographic features, such as roads, points of interest (including businesses, municipal facilities, etc.), lakes, rivers, railroads, municipalities, etc. A road network includes, among other things, roads and intersections located in the geographic region. Each road in the geographic region is composed of one or more road segments. A road segment represents a portion of the road. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segments may include sidewalks and crosswalks for travel by pedestrians.

The road segment data includes a segment ID by which the data record can be identified in the geographic database 123. Each road segment data record has associated with it information (such as "attributes", "fields", etc.) that describes features of the represented road segment. The road segment data record may include data that indicate a speed limit or speed category (i.e., the maximum permitted vehicular speed of travel) on the represented road segment. The road segment data record may also include data that indicate a classification such as a rank of a road segment that may correspond to its functional class.

The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The road segment data and the camera data or movable object data may be fused together seamlessly such that routing algorithms make no distinction between the types of landmarks. Alternatively, the collected data, camera data, or movable object data may be included in a separate database, for example, internal to the server 125 and/or the mobile device 122, or at an external location.

Figure 3:
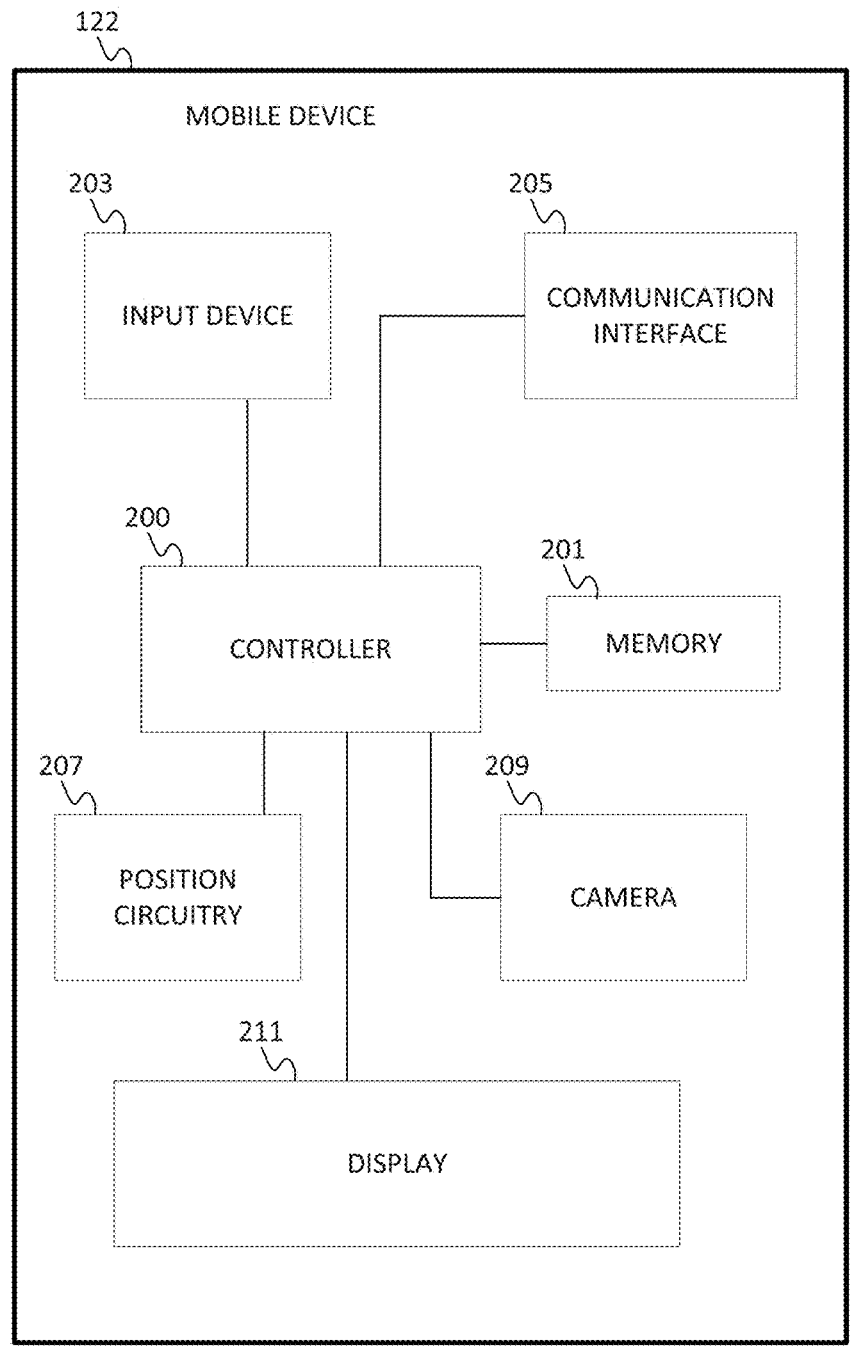
FIG. 3 illustrates an exemplary mobile device of the navigation system of FIG. 2.

FIG. 3 illustrates an exemplary mobile device 122 of the navigation system of FIG. 2. The mobile device 122 may be referred to as a navigation device. The mobile device 122 includes a controller 200, a memory 201, an input device 203, a communication interface 205, position circuitry 207, a camera 209, and a display 211. Additional, different, or fewer components may be provided.

The mobile device 122 may receive the guidance command from the server 125, which has analyzed one or more scenes including movable objects acquired by the image acquisition device(s) 130. Alternatively, the analysis of the movable objects may occur at the mobile device 122. The memory 201 includes computer program code executed by the controller 200 to cause the mobile device 122 to generate dynamic natural guidance.

The controller 200 is configured to determine identities of a plurality of movable objects in the vicinity of the mobile device 122. The identities of the movable objects are determined using image data collected by the image acquisition device 130, which may include camera 209. The identities of the movable objects may be determined using any of the image processing techniques discussed above.

The image data may be periodic images of a scene (e.g., a video stream). The controller 200 is configured to track movements of the movable objects over time in the periodic images of the scene. The controller 200 analyzes the identities of the plurality of movable objects and/or the movements of the movable objects in order to select a landmark as one of the movable objects suitable to server as a guidance reference point. The controller 200 generates a guidance command based on the location of the navigation device and a location of the landmark. Example guidance commands include "the entrance is behind the woman with the red hat," "turn right just past the orange construction barrels," and "turn down the alley in front of the Volkswagen Beetle." In alternative embodiments, tracking is not used. The moveable object is identified regardless of whether recently moving or not.

The controller 200 is configured to determine whether one of the movable objects should be used as part of a guidance command. The controller may check the locations of the movable objects to estimate whether any of the movable objects block line of sight of a subsequent road segment, or a sign corresponding to a subsequent road segment. If the subsequent road segment is not visible to the user, the controller 200 may substitute a guidance command that references the movable object. The reference to the moveable object may be provided in addition to road segment information.

In one embodiment, the controller 200 is configured to compare the available road segments and other map elements with respect to available movable objects to select the best option as a reference point in the route. The comparison may depend on the distance of the map element and/or movable object to the intersection of the next turn-by-turn direction. The comparison may depend on the suitability characteristics of the movable object. The comparison may depend on a user input for variable setting defining a preference (e.g., disable movable object references, favor movable object references, neutral preference for movable object references.)

In another embodiment, the controller 200 is configured to compare several (e.g., all known) movable objects to determine the best movable object to be incorporate into the guidance command. The comparison may be based on one or more suitability characteristics. Suitability characteristics include the identity of the movable object, the time elapsed that the movable object has been stationary, the location of the movable object, a degree to which the moveable object stands out from the surroundings, or other features. Different features may be combined into one suitability for a given object. Each suitability characteristic of each movable object may be associated with a suitability characteristic value, which may be a ranking, a percentile, or another number.

The identity of the movable object may be any of a predetermined set of movable object identities stored in the memory 201. Example objects in the predetermined set of movable objects include people, cars, trucks, bicycles, industrial trucks, construction signage, and other objects. The controller 200 may be configured to identify the identity of the movable object using computer vision or another computer recognition algorithm.

The time elapsed that the movable object has been stationary may be calculated by comparing subsequent video images over time. For some types of objects, a prolonged time period of remaining stationary may predict that the object is expected to remain stationary in the near future.

Examples include parked cars and temporary signs. For other types of objects, the amount of time an object has been stationary may not predict whether the object will remain stationary. The controller 200 may be configured to compare the amount of time a movable object has been stationary to a predetermined threshold. The predetermined threshold may be dependent on the identity of the object.

The location of the movable object affects whether the movable object should be used in a guidance command. The farther the movable object is from the intersection of the turn by turn instruction, the harder the instruction is to follow. Likewise, the farther the movable object is from the user, the more difficulty the user may have in located the movable object. The controller 200 may be configured to compare the distance of the movable objects to a location of the user to a predetermined user distance threshold and to compare the distance of the movable object to a location of the subsequent route intersection point to a predetermined intersection distance threshold.

Selection of the guidance reference point may involve a ranking of possible landmarks according to the comparison of distances, the amount of time the movable objects have been stationary, or the identity of the movable objects. A combination of any of these factors may be used. The controller 200 may be configured to apply a weighting system. For example, a weight for distance, a weight for time, and a weight for identity may each be selected as a fraction value (e.g., between 0 and 1), such that the three weights add up to 1.0. The weights may be selected by the user or an administrator. Alternatively, the weights may variable and change over time according to a learning algorithm based on the performance of the navigation system (e.g., the number of reroutes or wrong turns). The controller 200 may configured to select the highest ranking movable object or a set of highest ranking movable objects to be a landmark in the route. Alternatively, the controller 200 may compare the suitability characteristic values of two movable objects and select the higher suitability characteristic value.

Additional suitability characteristics may include the type of recent movements of the movable object or an intended path of the at least one movable object. The types of recent movements of the movable object may identify actions that are likely to indicate that the movable object will be relatively stationary for an amount of time sufficient for use as the guidance command. Example recent movements could be a person joining a line on the sidewalk (e.g., for a restaurant, event, etc.), a car coming to a stop, a car that a person just exited, or other recent movements. In one example, the suitability of the movable object may be determined by a probabilistic algorithm. The algorithm may base future decisions on the results of past decisions.

The controller 200 may be configured to consider the intended path of the movable object. For example, the controller 200 estimates future locations of the movable object based on past velocity and/or acceleration. The future location of the movable object at the time the mobile device 122 reaches the intersection in the route may be used in the route guidance command. Examples include "turn to follow the red car that just passed you," "you are going the right direction if a person wearing a yellow raincoat just crossed your path," and "follow the big haul truck ahead of you."

The camera 209 is an image acquisition device configured to collect data indicative of the plurality of movable objects. The camera 209 may be integrated in the mobile device 122 as shown by FIG. 3, or the camera 209 may be externally mounted to a vehicle. The camera 209 may be an optical camera, light detection and ranging (LIDAR) device, or other type of camera.

In embodiments in which the mobile device 122 analyzes the collected data, the communication interface 205 is configured to receive the collected data from the image acquisition device 130. In embodiments in which the server 125 analyzes the collected data, the communication interface 205 is configured to receive movable object data. The movable object data may include an identity field and a location field for each of the movable objects.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

Figure 4:
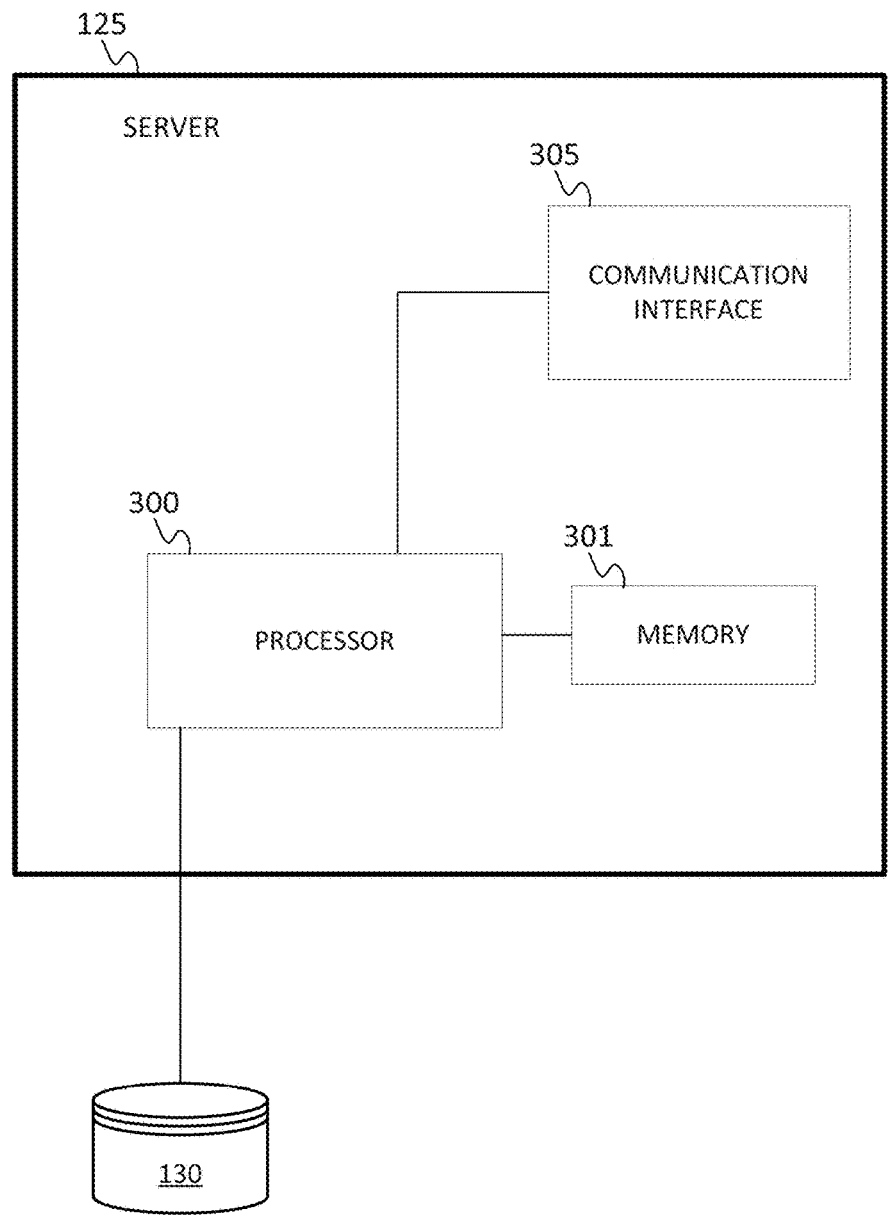
FIG. 4 illustrates an exemplary server of the navigation system of FIG. 2.

FIG. 4 illustrates an exemplary server 125 of the navigation system of FIG. 2. The server 125 includes a processor 300, a communication interface 305, and a memory 301. The server 125 may be coupled to a database 130. The database 130 may be a geographic database as discussed above. Additional, different, or fewer components may be provided.

The processor 300, through the communication interface 305, is configured to receive data indicative of a current location of the mobile device 122 and data indicative of a movable object in a vicinity of the current location of the mobile device 122. The data indicative of the current location of the mobile device 122 is generated by the position circuitry 207 of the mobile device 122. The data indicative of the movable object in the vicinity of the current location of the mobile device 122 may be raw image data as collected by the image acquisition device 130 or data processed by the processor 300.

The processor 300 is also configured to compare any of the suitability characteristic values above. The comparison may involve one or more movable object and one or more nonmovable object. The nonmovable objects may be map elements such as road segments, buildings, and natural features. When the movable object is more suitable to be referenced in the guidance command, the processor 300 is configured to select the movable object for the guidance command based on the suitability characteristic values. The guidance command is also selected based on the current location of the mobile device 122.

The guidance command may include a visible aspect description of the movable object so that the user can easily locate the movable object. The conspicuousness of the visible aspect may be measured by a prominence value (e.g., a scale from 0 to 10). The visible aspect may be a color, a size, an accessory or any other descriptor that can identify the movable object. Example guidance commands that reference a movable object and a visible aspect include "turn right just past the yellow car," "follow the tall woman with the red dress," or "turn left by the people with the stroller."

The processor may also analyze the visible aspects of the movable objects in determining whether the movable objects are suitable to be referenced in a guidance command. The suitability characteristics values above may include a value that indicates the existence of a visible aspect or the effectiveness of a visible aspect.

The communication interface 305 is configured to receive data indicative of the location of the mobile device 122 from the mobile device 122. The communication interface 305 is configured to receive data indicative of the location of the landmark from the image acquisition device 130.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 5:
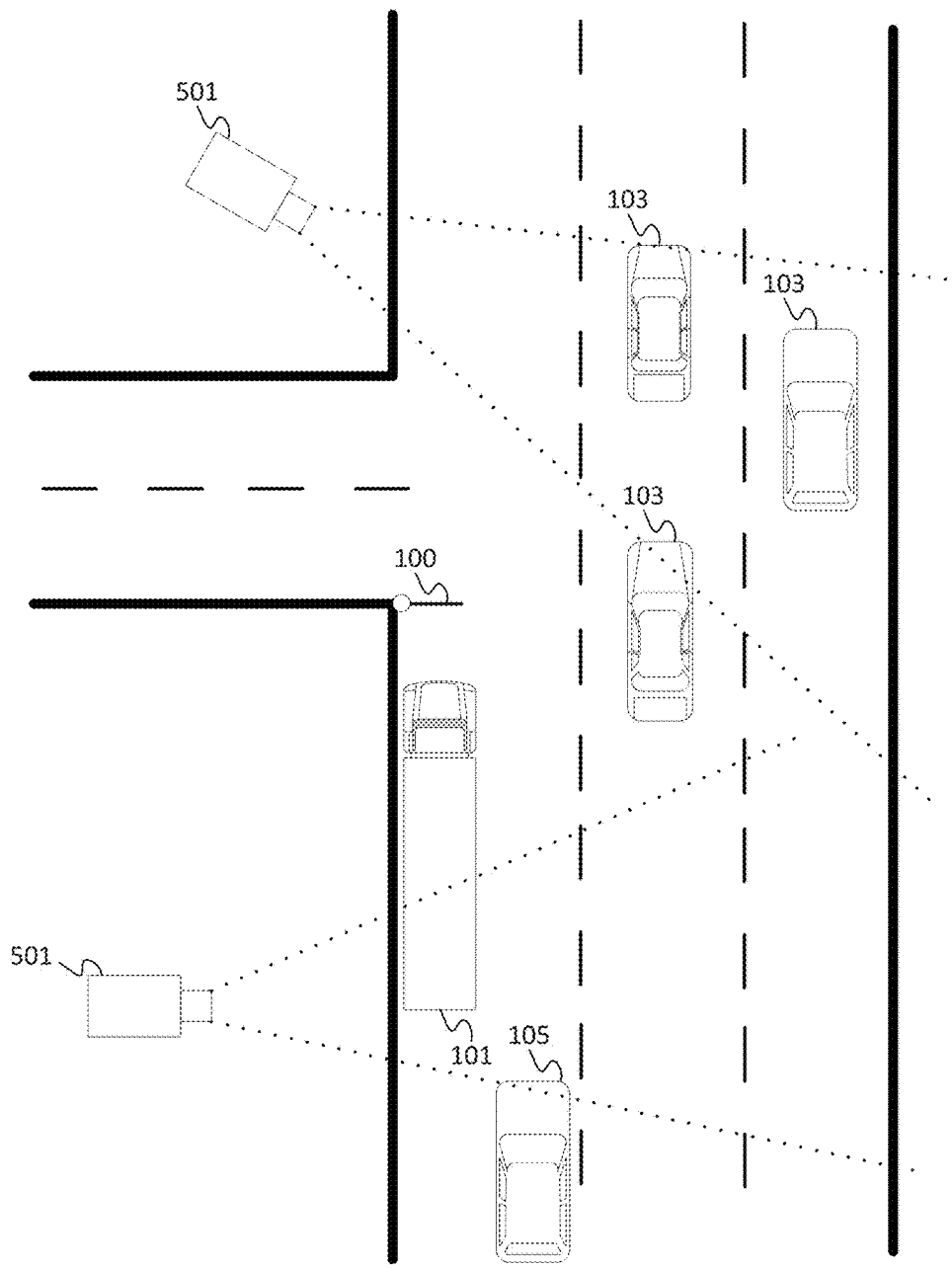
FIG. 5 illustrates one embodiment of an image acquisition system in a geographic region.
Figure 6:
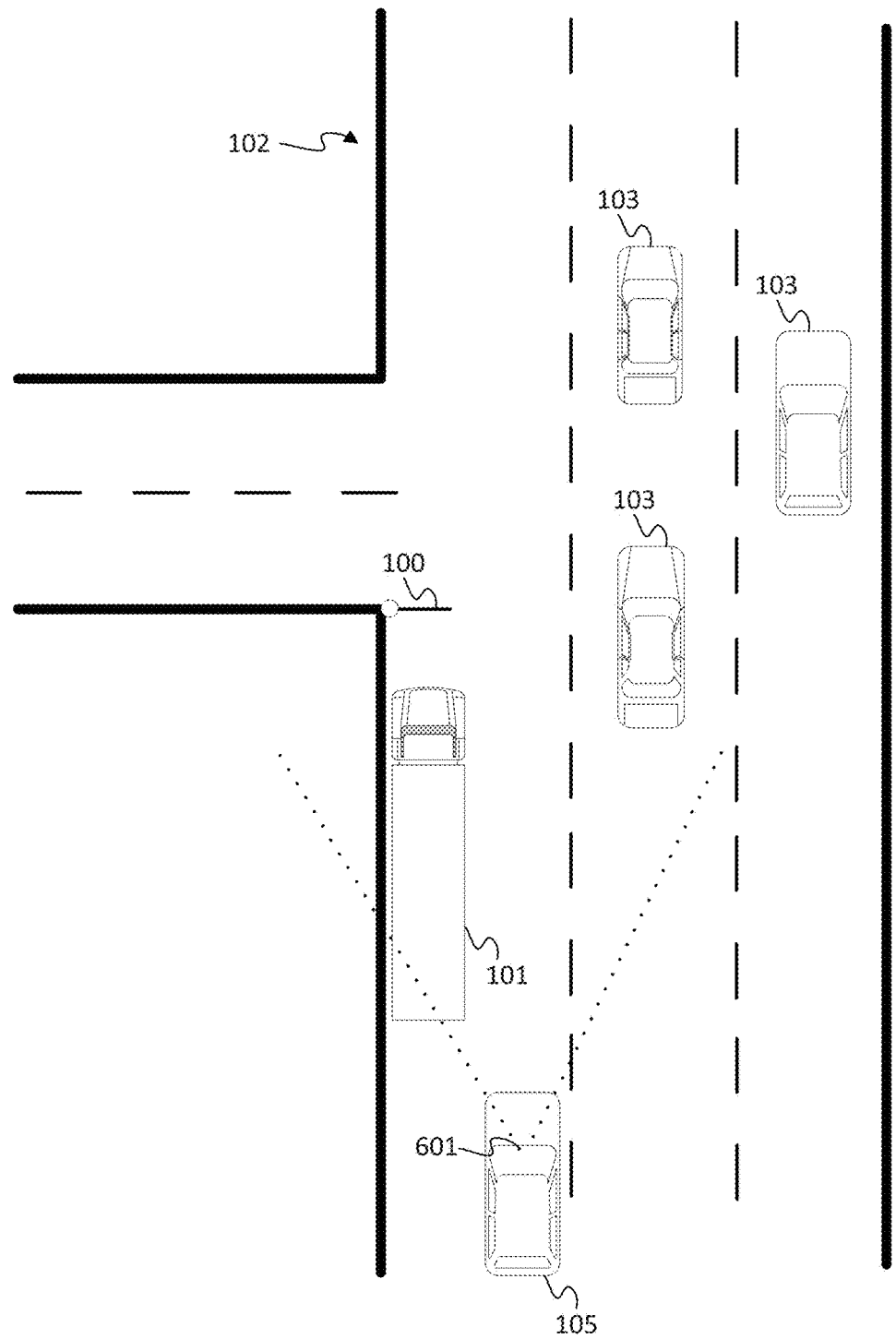
FIG. 6 illustrates another embodiment of an image acquisition system in a geographic region.

FIGS. 5 and 6 illustrate possible implementations of the image acquisition system 130 of FIG. 2. In FIG. 5, security cameras 501 view the geographic region shown in FIG. 1. The security cameras 501 may be traffic cameras, security cameras, or specifically tailored to track movable objects in the geographic region. The security cameras 501 collect camera data and transmit the camera data to the server 125. The cameras 501 are at known geographical locations for relating to the route. The angle of view of the cameras 501 may be fixed and known or may be sensed, indicating at least a general location of viewed objects.

In FIG. 6, a camera 601 is mounted on the vehicle 105 or incorporated with the mobile device 122. Data from the camera 601 is transmitted to the mobile device 122 or the server 125 for image processing, as discussed above. The camera 601 may have a viewing angle that includes movable objects in the vicinity of the vehicle 105. In another embodiment, several vehicles are equipped with cameras. Data collected in a camera associated with another vehicle, such as vehicles 103, is transmitted to the server 125 and used in the analysis of movable objects soon to be in the vicinity of vehicle 105. In other words, the mobile devices act as proxies collecting camera data that is used for the dynamic natural guidance of other mobile devices. The location of the camera 601 is known by the position sensor. A compass or other directional sensor may indicate direction of view.

Figure 7:
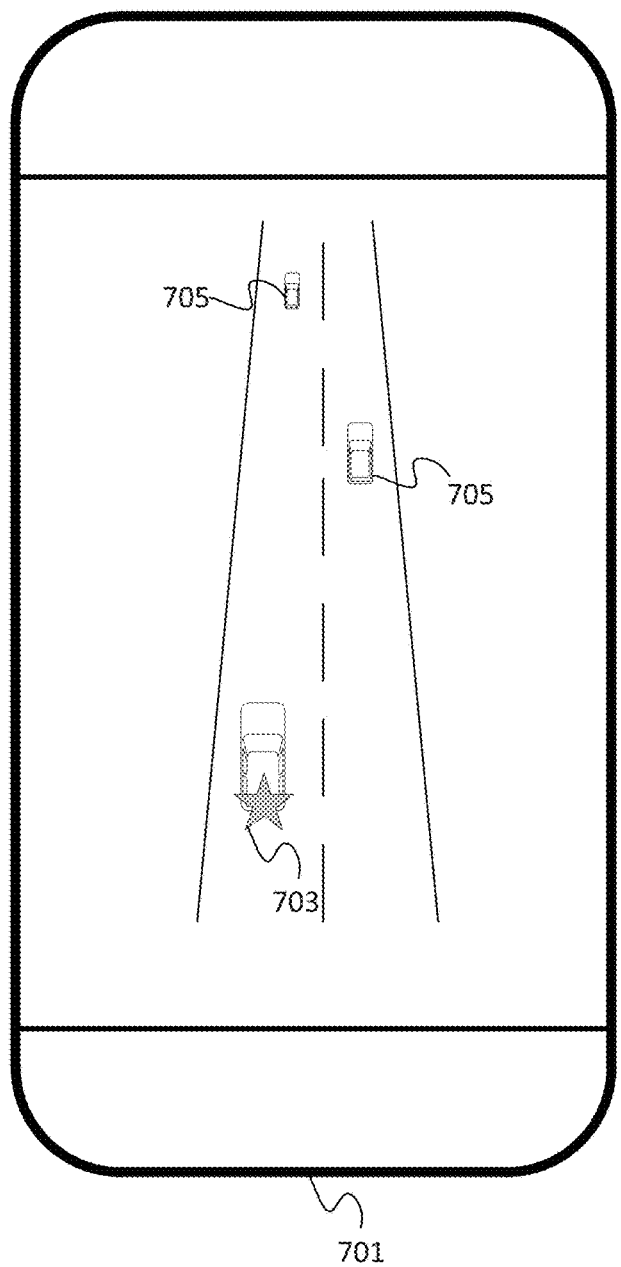
FIG. 7 illustrates an exemplary augmented reality system.

FIG. 7 illustrates an exemplary augmented reality system including a mobile device 701. The mobile device 701 executes an augmented reality application stored in memory. The augmented reality application enhances a user's view of the real world with virtual content. The virtual content is displayed in a layer above the real world content, which is captured by the camera. As shown in FIG. 7, video of the road and cars 703 are real world content captured by the camera, and the virtual content 705. The mobile device 701 or server 125 is configured to augment the image of the movable object display on the mobile device 125 by adding the virtual content 705. The virtual content 705 may be a star, another shape, a discoloration, or a highlight.

The virtual content may highlight a movable object on the display to provide a guidance command. For example, the guidance command may be "follow the highlighted car" or "turn left with the car marked with a star." Additional virtual content may include hyperlinks to additional information regarding the business. In other embodiments, graphics are added to a two-dimensional map or displayed route for highlighting a relative position, shape, and/or other characteristic of a movable object.

Figure 8:
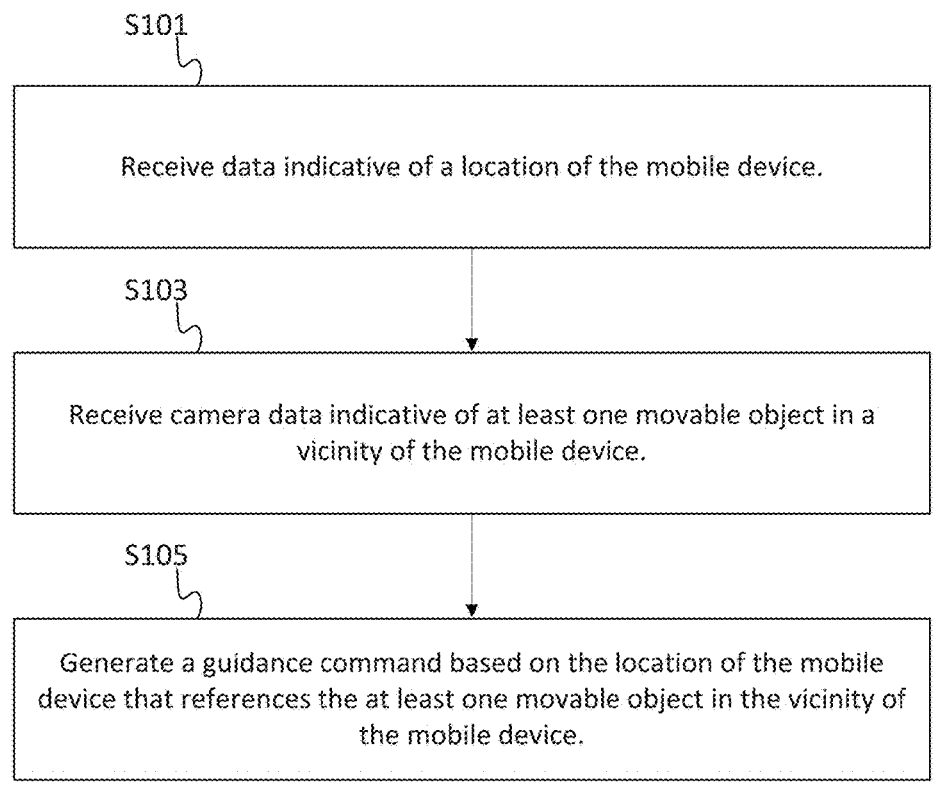
FIG. 8 illustrates a first example flowchart for dynamic natural guidance.

FIG. 8 illustrates a flowchart for dynamic natural guidance. The acts of the flowchart may be performed by any combination of the server 125 and the mobile device 122, and the term controller may refer to the processor of either of the devices. Additional, different, or fewer acts may be provided.

At act S101, the controller receives data indicative of a location of the mobile device 122. The location data may be determined based on GPS or cellular triangulation. The location data may be received at predetermined intervals or when the user accesses the guidance application.

At act S103, the controller receives camera data indicative of one or more movable objects in the vicinity of the mobile device. A movable object may be defined as anything that is not a fixture or not permanently static. The controller may access the camera data based on the location data. In one example, the camera data includes images, and the controller analyzes the images to determine the identity and/or characteristics of the one or more movable objects. In another example, the camera data includes a list of identities and characteristics for the one or more movable objects paired with locations of the movable objects.

At act S105, the controller generates a guidance command based on the location of the mobile device. The guidance command references the one or more movable objects in the vicinity of the mobile device. For example, the guidance command may state "turn in front of the yellow truck," "follow the man in the blue suede shoes," or "head toward the billboard with the sports car."

Figure 9:
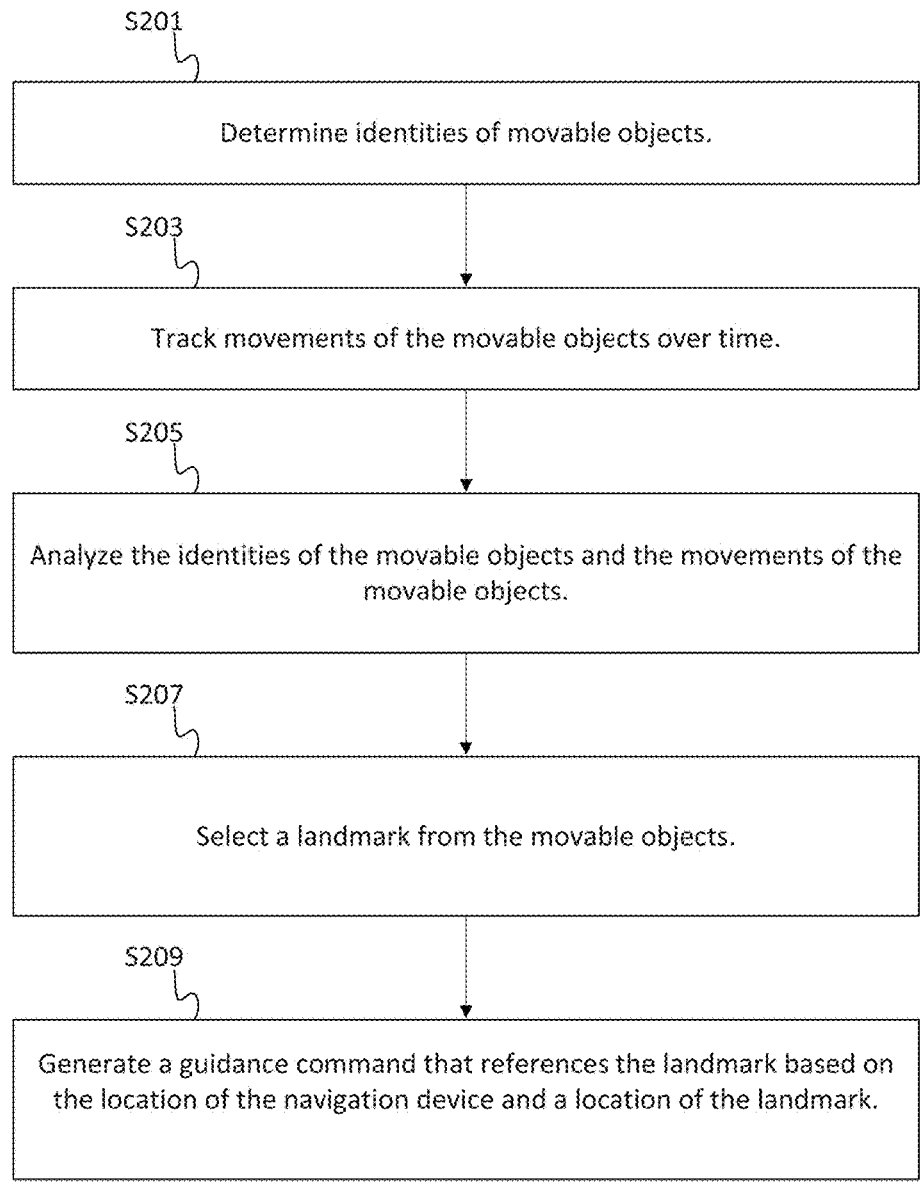
FIG. 9 illustrates a second example flowchart for dynamic natural guidance.

FIG. 9 illustrates another flowchart for dynamic natural guidance. The acts of the flowchart may be performed by any combination of the server 125 and the mobile device 122, and the term controller may refer to the processor of either of the devices. Additional, different, or fewer acts may be provided.

At act S201, the controller determines the identities of movable objects. The controller is configured to execute an image processing application or a computer vision application. For example, the controller may use feature extraction or other image recognition techniques to determine the types of objects in an image or video.

At act S203, the controller tracks movements of the movable objects over time. For example, the controller may measure an amount of time that each of the movable objects is stationary. At act S205, the controller analyzes the identities of the movable objects and the movements of the movable objects.

At act S207, the controller selects a landmark from the movable objects. The selection is based on the identities of the movable objects and the movements of the movable objects. For example, the controller may access a lookup table stored in memory that pairs a threshold time for the various types of movable objects. A first type of movable object, such as a truck, may be paired with a first threshold time, such as one hour. A second type of movable object, such as a person, may be paired with a second threshold time, such as a minute. The controller may be configured to select cars as movable objects for the guidance command when the cars have been stationary for more than the first threshold time and select people as movable objects for the guidance command when the people have been stationary for more than the second threshold time.

Alternatively, the movable object may be moving. The controller may be configured to rank the possible movable objects based on their appearance. For example, bright colors or significantly oversized or undersized movable objects may be selected.

At act S209, the controller generates a guidance command that references the landmark. The guidance command is based on the location of the navigation device and the location of the landmark. For example, in addition to the identities of the movable objects and the recent movement of the movable objects, the controller may compare the locations of the navigation device and the movable objects. The controller may calculate a distance between the navigation device and each of a set of potential movable objects. If the distance if less than a threshold distance (e.g., 10 meters, 50 meters), the controller selects the movable object for possible inclusion in the navigation command.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for providing natural guidance on a mobile device, the method comprising:
   receiving, at a server, data indicative of a location of the mobile device;
   receiving, at the server, image data from one or more cameras mounted at one or more static geographic locations with respect to the mobile device, the image data indicative of at least one movable object detected in a vicinity of the mobile device obstructing a view of a static object;
   determining, from the image data, a relative position of the at least one movable object with respect to the mobile device; and
   generating, using a processor, a route for a vehicle to a destination, the route including a guidance command for a turn along the route based on the location of the mobile device and the route,
   wherein the guidance command for the turn along the route is selected based on the relative position of the at least one movable object and the static object, wherein the guidance command for the turn along the route references the at least one movable object detected in the vicinity of the mobile device in place of a reference to the static object.

2. The method of claim 1, wherein the image data indicative of the at least one movable object identifies a position of the at least one movable object and a visible aspect of the at least one movable object.

3. The method of claim 2, wherein the visible aspect identifies the at least one movable object according to color or size.

4. The method of claim 1, wherein the image data indicative of the at least one movable object detected in the vicinity of the mobile device is camera generated.

5. The method of claim 1, further comprising:
   receiving, at the server, additional image data from a camera coupled to the mobile device; and
   determining, from the additional image data, the relative position of the at least one movable object with respect to the mobile device.

6. The method of claim 1, further comprising:
   analyzing a data set describing objects in the vicinity of the mobile device to identify the at least one movable object according to at least one suitability characteristic of the at least one movable object to be used in place of the reference to the static object.

7. The method of claim 6, wherein the at least one suitability characteristic comprises a time period that has elapsed since the at least one movable object has moved.

8. The method of claim 6, wherein the at least one suitability characteristic comprises an identification of the at least one movable object.

9. The method of claim 6, wherein the at least one suitability characteristic includes an intended path of the at least one movable object.

10. The method of claim 1, further comprising:
    augmenting an image of the at least one movable object on the mobile device.

11. The method of claim 6, wherein the at least one suitability characteristic comprises a distance between the at least one movable object and a destination location.

12. A navigation apparatus comprising:
    a memory including computer program code;
    a processor configured to execute the computer program code to cause the navigation apparatus to:
      determine, from image data captured by a camera mounted at a static geographic location with respect to the navigational apparatus, identities of a plurality of movable objects in a vicinity of the navigation apparatus;
      track movements of the plurality of movable objects over time with respect to the navigation apparatus;
      analyze the identities of the plurality of movable objects and the movements of the plurality of movable objects for use as reference points for guidance maneuvers;
      select a landmark from the plurality of movable objects; and
      generate a route for a vehicle including a turn guidance command based on the location of the navigation device and a location of the landmark, wherein the turn guidance command references the landmark as the a reference point for a guidance maneuver.

13. The navigation apparatus of claim 12, further comprising:
    a communication interface configured to receive data indicative of the location of the mobile device and receive data indicative of the location of the landmark.

14. The navigation apparatus of claim 12, further comprising:
    an image acquisition device configured to collect data indicative of the plurality of movable objects.

15. The navigation apparatus of claim 14, wherein the image acquisition device is a camera or a light detection and ranging device.

16. The navigation apparatus of claim 12, wherein the processor is configured to execute the computer program code to cause the navigation apparatus to:
- determine a suitability characteristic value for each of the plurality of movable objects; and
- perform a comparison of the suitability characteristic values, wherein the landmark is selected from the plurality of movable objects based on the comparison.

17. The navigation apparatus of claim 16, wherein the suitability characteristic value relates to an identity of the plurality of movable objects, a stationary time of the plurality of movable objects, or a location of the plurality of movable objects with respect to a destination location.

18. The navigation apparatus of claim 11, wherein the turn guidance command includes virtual content overlaid on video of the landmark.

19. A non-transitory computer readable medium including instructions that when executed are operable to:
- receive, at a processor, data indicative of a current location of a vehicle;
- receive, at the processor, camera data indicative of a movable object in a vicinity of the current location of the vehicle, wherein the camera data is collected by a security camera from a building, a traffic camera, a satellite camera, an aerial camera, or a camera coupled to another vehicle; and
- generate, using the processor, a route for the vehicle including a turn guidance command based on the current location of the vehicle, wherein the turn guidance command references the movable object in the vicinity of the current location of the vehicle in place of a reference point for the turn.

20. The non-transitory computer readable medium of claim 19, the instruction further operable to:
- perform a comparison of a suitability characteristic value of the movable object to a suitability characteristic of a nonmovable object; and
- select the movable object for the turn guidance command based on the comparison.

* * * * *